United States Patent Office 3,490,219
Patented Jan. 20, 1970

3,490,219
SUPER HIGH SPEED SPINNING METHOD AND APPARATUS FOR MANUFACTURING JET BUNDLE YARN
Goro Ozawa, Kenzo Kosaka, Tadashi Kataoka, Toshio Horikawa, Kiyoshi Adachi, Hideo Tanaka, and Hiroshi Kitagawa, Nagoya-shi, and Akira Aoki, Inazawa-shi, Japan, assignors to Mitsubishi Rayon Company Limited, Tokyo, Japan, a company of Japan
Filed Aug. 14, 1967, Ser. No. 660,301
Claims priority, application Japan, Dec. 29, 1966, 41/527; Feb. 8, 1967, 42/7,723; Feb. 13, 1967, 42/8,782; May 16, 1967, 42/30,582
Int. Cl. D01h *1/00*
U.S. Cl. 57—34                                       32 Claims

ABSTRACT OF THE DISCLOSURE

This relates to a method and apparatus for producing a jet bundled yarn (fluid twisted yarn) from conventional spinning fiber material at production speeds of over 300 m./min. It is applicable to thermoplastic synthetic fibers as well as cotton fiber, rayon staple fibers, wool, acetate staple fiber, silk cut fiber and certain mineral fibers. The jet bundled yarn produced by practicing this invention has useful properties for industrial use and for weaving or knitting cloths.

BACKGROUND OF THE INVENTION

In the conventional spinning process, the production speed of spun yarn is limited to about 100 m./min. It is quite difficult to produce acceptable yarns at spinning speeds in excess of 100 m./min. by using the conventional twisting and winding apparatus.

Fluid twisted yarn was disclosed in the Czechoslovakian Patent No. 91,208 issued in 1958, and in the technical publication Textilni Strojirenstvi, 1961 (pages 156–160). According to the above-mentioned prior art, the relative fiber alignment of the fed material must be completely broken by the drawing action of the fluid stream of the break spinning device. This was necessary to break the continuation of the fed material from the twisted yarn of the spinning device to prevent so-called false twisting of the fed material. The resulting yarn strength is inferior to the conventional spun yarn at present and the practical counts of yarn is up to 40s (English count system). Moreover, the appearance of the yarn produced is fluffy and in general, the yarn produced by this technique cannot be considered as practical, commercial yarn.

U.S. Patents No. 3,009,309 and No. 3,279,164, issued in 1961 and 1966, respectively, disclose some prior art for producing fluid twisted yarn. However, in these U.S. patents, the yarns are always fancy yarns, such as sheaf-yarn. Hence, the end use of the yarns produced by the above-mentioned U.S. patents are restricted to obtaining a fancy effect only, and it is known that the production speed of such yarn is limited to 100 m./min.

BRIEF SUMMARY OF THE INVENTION

The jet bundled yarn produced by the jet bundling process of the invention has a novel configuration which comprises a bundle of core fibers having substantially zero twist and a surface wrapping of discontinuous fibers surrounding the bundle of core fibers. The surface wrapping of fibers has a net-like configuration and tightly binds the bundle of core fibers.

By our experiments, the yarn produced according to the invention has practical mechanical properties which are similar to those of conventional twisted spun yarn having a twist multiplier of more than 40 (in metric count system).

According to the present invention, a spinning material composed of staple fibers is drafted by a draft element comprising one pair of back rollers and one pair of front rollers. The drafted material is fed into a nozzle-shaped member through which a heated, vortical fluid stream is circulated under high pressure. The heated, swirling, pressurized fluid causes the short fibers positioned on the circumferential portion of the drafted material to twist around the main portion of the drafted material in a net-like configuration. It should be noted that only the circumferentially located fibers undergo any twisting and the central core of fibers remain substantially untwisted. The material delivered from the nozzle-shaped member is taken up under slight tension by one pair of take-up rollers and wound up on a package at a speed of over 300 m./min. In instances where the material contains some thermoplastic synthetic fibers, the temperature of the vortical fluid stream is maintained sufficiently high to plasticize the thermoplastic synthetic fibers which are located on the circumferential portion of the yarn thereby causing them to shrink and become fixed to each other at their contact portions. Consequently, a net-like configuration of fibers is formed at the circumferential portion of the yarn which firmly binds the main portion or core portion of the yarn resulting in a novel jet bundled yarn.

As described above, the process of manufacturing the jet bundled yarn of the invention comprises three main steps; first, drafting a spinning material composed of staple fibers, such as sliver or roving, secondly, jet bundling the drafted material by means of a heated, vortical fluid stream supplied under high pressure and thirdly, taking up and winding the material on a package.

In order to firmly bind the bundle of core fibers, it is necessary to permanently fix the surface fibers of yarn at their contact portions. The above-mentioned manner of using thermoplastic synthetic fibers is one method which can be utilized when the vortical fluid stream is maintained at a sufficiently high temperature to melt the synthetic fibers.

However, the following method can be used when the fed material used does not contain thermoplastic fibers. For example, cotton fiber, rayon staple fibers, wool, acetate staple fiber, silk cut fiber, certain mineral fibers, etc., can be used for producing the jet bundled yarn according to the present invention provided a suitable fixing or bonding agent is intermixed with the fed material or contained in the fluid stream.

The above-mentioned thermoplastic synthetic fiber is not restricted to any particular fiber but refers to all kinds of fibers, such as polyamide fiber, polyester fiber, acrylic fiber, polyolefin fiber, polyvinyl alcohol fiber, polyvinyl chloride fiber and their blended fibers. Moreover, it is also possible by using the apparatus of the present invention, to produce an acceptable yarn composed of a bundle of core filament yarns having a surface wrapping of short fibers wrapped therearound in a net-like configuration. It is further possible to produce a jet bundled yarn composed of a bundle of core staple fibers having a surface wrapping of multifilament for continuously binding the bundle of core staple fibers.

Generally, the apparatus for producing the jet bundled yarn according to the invention comprises, means for supplying the spinning material, a guide member for feeding the material to the apparatus, a draft element having at least one pair of back rollers and one pair of front rollers which rotate at a speed of over 300 m./min., one pair of feed rollers for feeding the drafted material into a nozzle-shaped member through which heated vortical fluid stream passes under a high pressure, one pair of take-up rollers rotating at a higher surface speed than the delivery speed of the jet bundled yarn and a conventional winding mechanism for producing packaged yarn.

The principal object of the present invention is to provide a method and apparatus for producing a novel and commercially acceptable jet bundled yarn having useful properties for industrial use and for weaving or knitting cloths.

A further object of the present invention is to provide an economical method and apparatus for producing a novel and commercially acceptable jet bundled yarn at spinning speeds greater than 300 m./min.

It is still further object of the present invention to provide a method and apparatus for producing a jet bundled yarn which does not have normal twist configuration and an undesirable fluffy appearance, but does have uniform yarn thickness and acceptable mechanical properties not inferior to the conventional spun yarn.

Other objects and features of the invention will more fully appear from the following description and accompanying drawings and will be particularly pointed out in the claims.

DETAILED DESCRIPTION OF THE INVENTION

Figure 1:
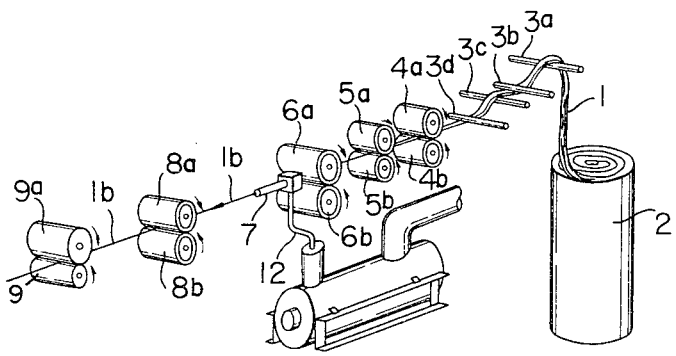
FIG. 1 is a perspective view of an embodiment of the apparatus for producing jet bundled yarn of the invention.
Figure 2:
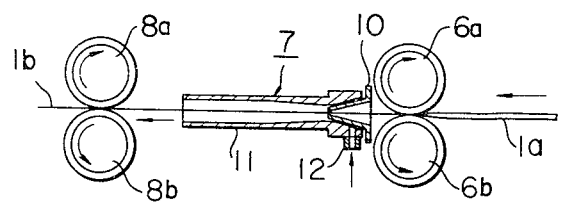
FIG. 2 is a side view, partly in section of the jet bundling member of the apparatus shown in FIG. 1.

Referring to FIGS. 1 and 2, an embodiment of an apparatus for producing jet bundled yarn comprises a spinning material 1 stored in a container 2, guide elements 3a, 3b, 3c and 3d and a draft mechanism composed of a pair of back rollers 4a and 4b, a pair of middle rollers 5a and 5b, a pair of front rollers 6a and 6b which rotate at a higher surface speed than 300 m./min. A jet bundling member 7, through which a heated, vortical fluid stream is circulated under high pressure is provided along with a pair of take-up rollers 8a, 8b and a conventional winding device 9.

The spinning material 1 stored in the container 2 is fed to the apparatus through the guide elements 3a, 3b, 3c and 3d and then drafted in the draft field existing between the three pairs of rollers 4a and 4b, 5a and 5b, 6a and 6b, as done in the conventional draft system. Then the drafted material 1a is fed to the jet bundling member 7.

The jet bundling member 7 comprises a trumpet-like inlet 10, a jet bundling conduit 11 and a connecting passageway 12. The interior portion of the inlet 10 is considerable converging whereas the beginning portion of the jet bundling conduit 11 is diverged, as shown in the drawing. The fluid stream is supplied under pressure through the inlet 10 into the conduit 11 in such a way that the fluid is directed tangentially into the cylindrical narrow space 15 surrounding the trumpet-like inlet 10. Therefore a vortical fluid stream is generated in the jet bundling conduit 11 so that the vortical fluid stream is ejected therefrom as an aspirating jet as shown in FIG. 2.

The drafted material 1a is sucked into the trumpet-like inlet 10 by the aspirating fluid jet and carried along the longitudinal axis of the jet bundling conduit 11 by the vortical fluid stream while twisting surface fibers around a bundle of core fibers. Therefore the surface fibers of the drafted material 1a are twisted around a bundle of core fibers of the drafted material 1a by the twisting action of the vortical fluid stream while it circulates through the jet bundling conduit 11. The twisted fibers form a net-like configuration wrapping around the bundle of core fibers of the drafted material 1a and consequently, the fibers contained in the core portion of the material 1a are firmly bound by the net-like configuration of surface fibers. It is necessary to permanently set the above-mentioned configuration while the drafted material 1a passes through the conduit 11 in order to form a stable configuration of the yarn. When certain thermoplastic synthetic fibers are blended in the spinning material 1, or the spinning material 1 is composed of certain thermoplastic synthetic fibers and the supplied fluid is maintained at a sufficiently high temperature to shrink and melt the synthetic fibers, the fibers forming the net-like configuration shrink and are partly melted. Thus, the fibers forming the net-like configuration are fixed to each other at their contact portions and at their end points resulting in a novel fluid twisted yarn 1b having a stable configuration.

Figure 3:
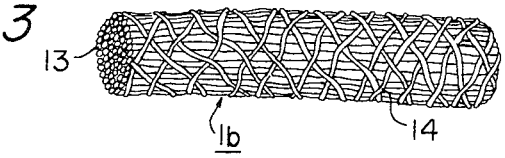
FIG. 3 is an enlarged perspective view of the jet bundled yarn produced by the apparatus shown in FIG. 1.
Figure 4:
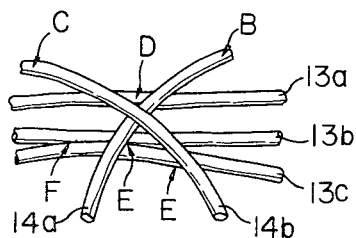
FIG. 4 is an enlarged explanatory view for showing the surface of the jet bundled yarn shown in FIG. 3.
Figure 5:
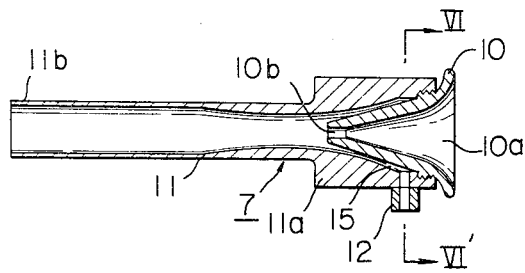
FIG. 5 is an enlarged side view of the jet bundling member shown in FIG. 2.
Figure 6:
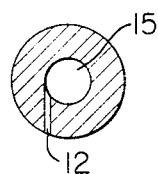
FIG. 6 is a cross-sectional view of an embodiment of the jet bundling member, taken along line VI–VI' in FIG. 5, FIGS. 7 and 8 are cross-sectional views of several embodiments of the jet bundling member, taken in the same manner as the drawing shown in FIG. 6, FIGS. 9, 10, 11, 12, 13, 14 and 15 are sectional side views of several embodiments of the jet bundling member of the invention.
Figure 7:
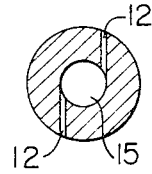
Figure 8:
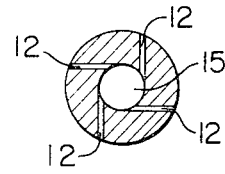

In the drawings of FIGS. 3 and 4, the main portion of the core portion 13 of the jet bundle yarn 1b is firmly held in place by the net-like portion 14 of surface fibers. The surface fibers comprise bound fibers 14a, 14b, etc. wrapping the fibers 13a, 13b, 13c, etc. of the main portion 13 of the yarn in such a way that the bound fibers 14a, 14b, etc. are firmly fixed to each other at their contact portion D and fixed to the fibers 13a, 13b, 13c, etc. at their contact portion E. Some of the fibers 13a, 13b, 13c, etc. are firmly fixed to each other at their contact portions F. The yarn 1b is taken up by the take-up rollers 8a and 8b, and then wound up on a package 9a by the winding device 9. As described above, yarn without fluffy fiber-ends can be produced by the apparatus of the invention.

THE JET BUNDLING MEMBER

Figure 9:
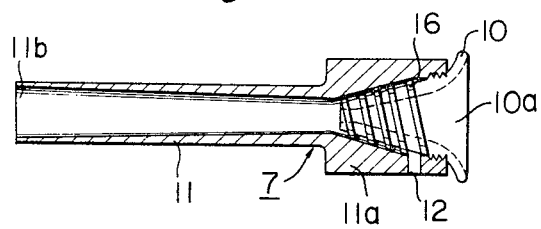
Figure 10:
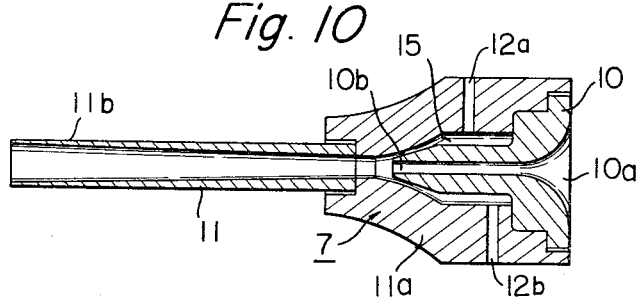
Figure 13:
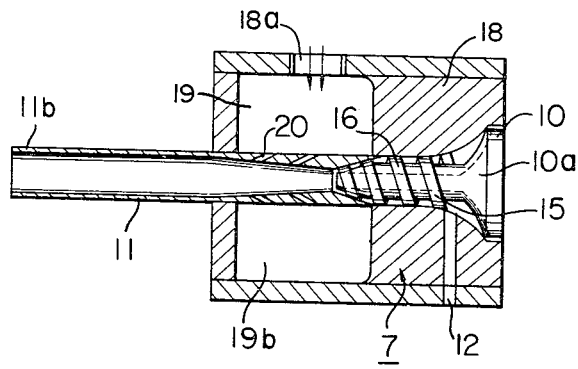

Referring to FIGS. 2, 5, 6, 7 and 8, the jet bundling member 7 comprises a trumpet-like inlet 10 having a fluid supply passage 12 and a jet bundling conduit 11. The inlet portion 10a of the trumpet-like inlet 10 funnels outwardly towards the front rollers 6a and 6b. The trumpet-like inlet 10 is screwed into an extended portion 11a of the jet bundling conduit 11 in such a way that a cylindrical space 15 is formed between them. The cylindrical space 15 is connected to a starting portion of the jet bundling conduit 11 and functions to produce an effective vortical stream in the conduit 11. Several types of connecting passageway 12 may be applied and in FIGS. 6, 7 and 8, a single, duplicate and quadruplicate passageway 12, are shown, respectively. Each passageway 12 is tangentially located with respect to the cylindrical space 15 to insure that the fluid is fed tangentially to the cylindrical space 15 to produce a vortical fluid stream in the conduit 11. To produce a more continuous vortical fluid stream in the conduit 11, the trumpet-like inlet 10 is provided with a spiral groove 16 for restricting the passage of the fed fluid stream, as shown in FIGS. 9 and 13. FIG. 10 shows another embodiment of the jet bundling member, having almost the same construction as that shown in FIG. 5, with the exception of a tapered fluid passage in the conduit 11 and duplicate passageways 12a, 12b opening into cylindrical space 15.

Figure 11:
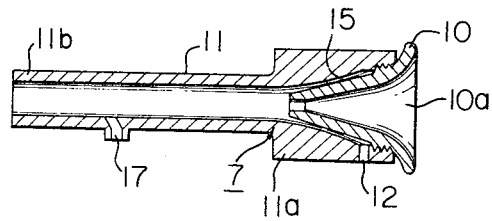

A supplemenetal fluid passageway 17 is drilled through the conduit 11 at its middle portion as shown in FIG. 11. The passageway 17 directs fluid tangentially into the conduit 11 and acts as a booster to maintain the already swirling fluid in a vortical condition.

Figure 12:
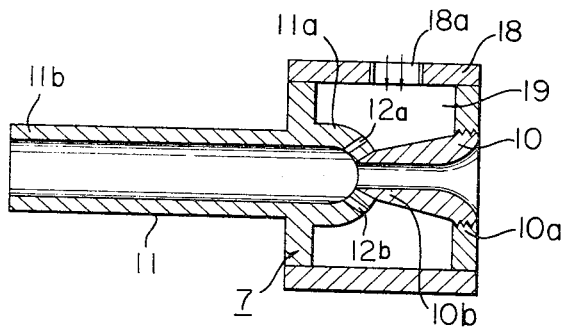

In another embodiment of the jet bundling member, shown in FIG. 12, an inside terminal 10b of the trumpet-like inlet 10 opens into a starting portion 11a of the jet bundling conduit 11. Duplicate connecting passageways 12a and 12b connects a jacket 18 which surrounds the trumpet-like inlet 10 to the fluid passageway of the jet bundling conduit 11.

The jacket 18 is mounted on the jet bundling member, as shown in FIG. 12, in such a way that the starting portion 11a of the jet bundling conduit 7 and the trumpet-like inlet 10 are surrounded by the jacket 18. A cylindrical room 19 is formed between the jacket 18 and the jet bundling member and a fluid supply passageway 18a is drilled through the jacket 18. A compressed fluid stream is supplied through the fluid supply passageway 18a and directed into the fluid pasasgeway of the jet bundling conduit through the cylindrical room 19 and the connecting passageways 12a and 12b.

Another embodiment of the jet bundling member shown in FIG. 13 has a similar construction to that of shown in FIG. 9, with some exceptional elements: a jacket 18 and a plurality of supplemental fluid passageways 20 drilled through the jet bundling conduit 11. The jacket 18 is mounted on the jet bundling member in such a way that a starting half portion of the jet bundling conduit 11 and the trumpet-like inlet 10 is surrounded by the jacket 18, and a cylindrical room 19 is formed between the jacket 18 and the jet bundling conduit 11 and the supplemental fluid passageways 20 are drilled to direct fluid tangentially into the fluid passageway of the conduit 11. A fluid supply passageway 18a is drilled through the jacket 18 and a fluid supplied through the passageway 18a is fed into the conduit 11 through the passageway 20.

Figure 14:
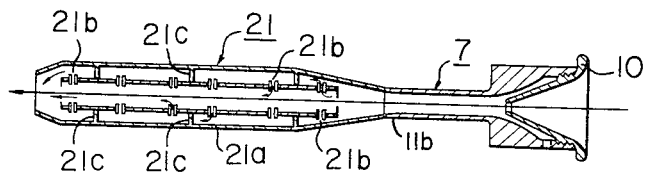

In FIG. 14, another embodiment of the jet bundling member is shown. Due to the fact that considerable noise is produced when the vortical stream is ejected at a high speed from the conduit 11, it is desirable to eliminate or at least minimize this noise. Accordingly, the jet bundling member 7 is fluid connected at its outlet end 11b with a muffler 21 which is of conventional construction and comprises outside and inside shells 21a, 21b, respectively, and a plurality of intervening walls 21c.

Figure 15:
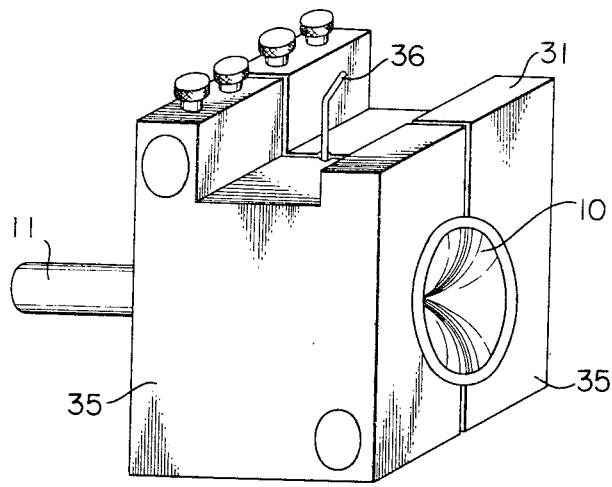

Another embodiment of the jet bundling member 7 is shown in FIG. 15 and comprises the trumpet-like inlet 10 and the jet bundling conduit 11 in fluid communication with the inlet 10, as described above, and includes a jacket-type heater 35 surrounding the conduit 11 and the inlet 10. The temperature of the jacket 35 is measured by a thermo-couple 36 mounted on the jet bundling member 7 whereby the working temperature of the vortical fluid stream in the jet bundling conduit 11 is accurately controlled.

In the above-mentioned embodiments of the jet bundling member, the following conditions should be considered:

(1) The sucking force at the diverged portion 10a of the trumpet-like inlet 10 should be sufficient to introduce the drafted material 1a so that the spinning operation can be easily started and can be continuously carried out without yarn breaking.

(2) The fluid twisting action in the conduit should be sufficient to form a net-like configuration of surface staple fibers wrapped around the core portion of the yarn. In other words, the vortical stream in the conduit 11 must be sufficiently strong to form the net-like configuration of surface fibers of the yarn.

(3) The relative position of fibers contained in the core portion of the drafted material must be maintained while passing through the conduit 11.

(4) The fibers forming the net-like configuration must be fixed to each other during or just after delivery from the conduit 11.

The arrangement of the various elements of the above-mentioned jet bundling members are designed to conform with the above-mentioned desirable conditions.

The inside diameter of the conduit 11 is dependent upon the yarn count, but a diameter of from 4 mm. to 20 mm. is preferable. The length of the conduit 11 must not be less than four times the inside diameter of the conduit 11, and it is preferable to choose a length of from 10 times to 200 times but less than 500 times the inside diameter.

THE DRAFT CONTROL DEVICE

One of the important objectives of the present invention is high production efficiency. It is therefore necessary to obtain a stable draft condition from which uniform yarns may be produced. Certain draft control elements for use with the apparatus of the invention are required, have been disclosed, and some of these can be considered as being novel draft control means.

Figure 16:
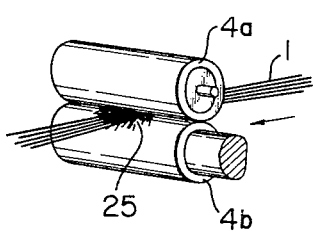
FIGS. 16 and 17 are explanatory views showing the ruffled condition of fibers in the high speed draft zone of the draft element.
Figure 17:
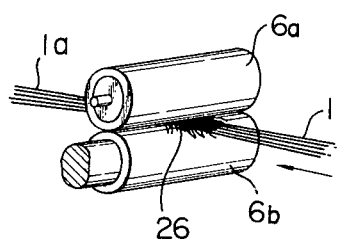

Referring to FIGS. 16 and 17, fluffy staple fibers 25, 26, which are produced adjacent to the nip point of the pair of rollers 4a, 4b and 6a, 6b, increase as the speed of the draft rollers 4a, 4b and 6a, 6b increases. Particularly, in cases where the surface speed of the front rollers 6a, 6b is over 300 m./min., the formation of the fluffy staple fibers 25, 26 is increased to such an extent that it is difficult to produce yarn having uniform thickness.

Figure 18:
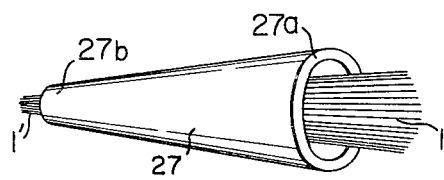
FIGS. 18, 19 and 20 are explanatory views of draft control attachments applied to the apparatus of the present invention.

In FIG. 18, a funnel-like draft control device, which is useful for minimizing the formation of fluffy and short fibers 25 and 26 (refer to FIGS. 16, 17), is shown. The funnel-like draft control device 27 is disposed in the draft field between the pair of back rollers 4a, 4b and the pair of front rollers 6a, 6b. The delivered material 1 goes into the diverged mouth 27a of the draft control device 27 and exits from the converged mouth 27b thereof.

Figure 19:
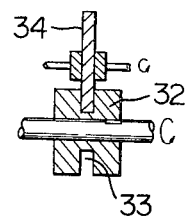

FIG. 19 shows another draft control device utilizable with the apparatus of the present invention. This draft control device comprises a grooved roller 32 having a groove 33 formed on the periphery thereof. A pressure roller 34 engages with the groove 33 to form a control passage for the drafting material. This type of control device cannot be used for carrying out the draft operation at high speed but it is sometimes useful for defining the passage of the drafting material having a long staple length.

Figure 20:
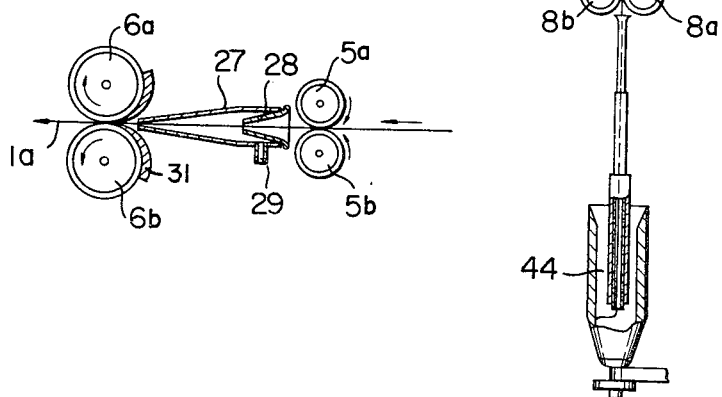

Sometimes it is more effective to use a funnel-like draft control device 27, shown in FIG. 20, when the delivery speed of the front rollers 6a, 6b is over 2,000 m./min. Control air is supplied through a fluid inlet 29 in such a way that the smooth movement of the material is not hampered by the draft control device 27 except to the extent that the device effectively controls the formation of floating fibers. It is desirable that the control device 27 be gradually tapered towards the nip point of the front rollers 6a, 6b. Further, a pair of curved attachments 31 are positioned adjacent to the pair of rollers 6a and 6b for preventing the formation of fluffy fibers which would otherwise be caused by eddy air currents existing upstream of the rollers 6a and 6b, particularly at spinning speeds up to 500 m./min. The curved attachments 31 are preferably in light contact with the front rollers. In some instances, a conventional draft apron can be used as the draft control device.

Figure 22:
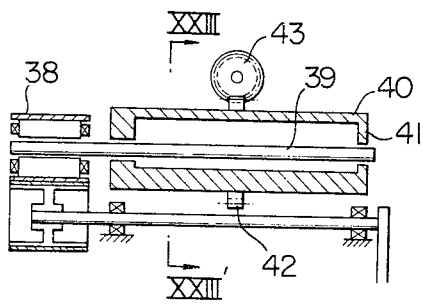
FIG. 22 is a side view of the loading means for the draft roller of an apparatus for producing a jet bundled yarn of the present invention.
Figure 23:
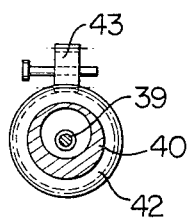
FIG. 23 is a cross-sectional view of the loading means of the draft roller, taken along line XXIII–XXIII' in FIG. 22.

As already illustrated, the rotational speed of the draft rollers is very high and therefore, it is impractical to use a conventional loading means for the draft rollers. The loading means shown in FIGS. 22 and 23 is one embodiment of a loading means suitable for practicing the invention. A shaft 39 of a top roller 38 of the draft element is supported by a cylindrical bearing 41 in such a way that the shaft 39 is secured to an eccentric sleeve 40 which is also supported by the cylindrical bearing 41. A worm wheel 42 is mounted on the cylindrical bearing 41 and meshes with a worm 43. Consequently, the driving of the worm 43 is transmitted to the cylindrical bearing 41 through the worm wheel 42 and produces a vertical displacement of the top roller 38. By this loading system, the vibration of the top roller 38 is completely prevented and the spinning material can be effectively nipped. Other loading means utilizing either oil pressure or pneumatic pressure can also be used to attain the present purpose of the invention.

PREFERABLE CONDITION OF THE JET BUNDLING YARN

To obtain a stable configuration of yarn produced in accordance with the invention, the condition of the vortical fluid stream in the jet bundling conduit 11 must be considered in relation to the physical properties of the fibers contained in the spinning material 1.

It was found as a result of our experiments that the general relationship between speed V, pressure P and temperature T of the supplied fluid stream is characterized by the following relationships (when a certain kind of thermoplastic synthetic fiber is used, as delineated below):

$$V < 10T\sqrt{P}$$
$$T > 230$$

where V is the feeding speed of the draft roller in meter/minute,

T is the temperature of the supplied fluid in ° C., and
P is the gauge pressure of the supplied fluid in kg./cm.$^2$.

When the fluid temperature T is below 230° C., it is difficult to produce a stable net-like wrapping around the main portion of the produced yarn, even though the pressure P is sufficiently high.

For example, if the drafted material 1a contains acrylic fibers having a 5% shrinkable property and the blend ration of the fibers is more than 20%, and if the temperature of the vortical stream in the conduit is sufficiently high to shrink the shrinkable fiber, i.e., more than 130° C., a strong and practical jet bundled yarn of the invention can be produced. Heated air, gas, or superheated steam can be used as the fluid, or, under certain conditions, heater gas containing a plasticizer, solvent or bonding agent, may be used as the fluid for practicing the present invention.

As the operating speed of the jet bundling apparatus is increased, the time period during which the drafted material 1a remains in the conduit 11 becomes shorter. Consequently, to attain the effective action of the jet bundling, a stronger vortical fluid stream maintained at a higher temperature must be produced. The fluid pressure at the passageway 12 is acceptable within the range of from 1.5 to 10 kg./cm.$^2$ and preferably from 2 to 4 kg./cm.$^2$.

The take-up speed of the take-up rollers is also important to produce a good quality yarn. Generally, the take-up speed of the take-up rollers 8a, 8b must be faster than that of the delivery speed of the front rollers 6a and 6b to insure that the jet bundling operation of the drafted material 1a is carried out under tension. However, this tension must be less than the tension necessary for inducing relative longitudinal displacement of the fibers contained in the drafted material 1a. When 5% shrinkable fibers are contained in the drafted material and the vortical fluid stream is maintained at a sufficiently high temperature to shring the fiber during jet bundling of the material 1a, the above-mentioned tension contributes to make the net-like configuration more stable and helps bind the main portion of the drafted material 1a more firmly.

In a preferable condition, the drafted material 1a is streached more than 1% and less than 5% and the preferable tension depends upon the thickness of the drafted material 1a. For example, the tension loading on the drafted material just before sucking into the jet bundling member is acceptable within the range of from 20 to 100 g. but is preferably from 25 to 50 g. and the tension on the jet bundled yarn just before feeding to the take-up rollers 8a and 8b is acceptable within the range of from 10 to 50 g. but from 15 to 40 g. preferably. By means of a post heat-treatment of the jet bundled yarn at above 80° C., it is possible to obtain yarn having at least the same breaking strength as the conventional spun yarn, even though the yarn count and the spinning material are the same in both yarns.

Figure 21:
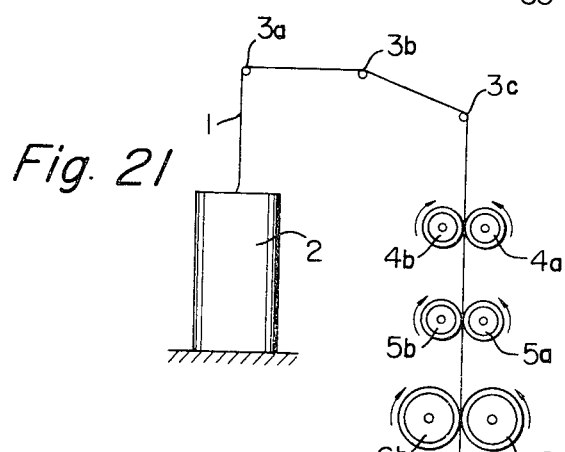
FIG. 21 is a schematic side view of another embodiment of the apparatus for producing a jet bundled yarn of the present invention.
Figure 24:
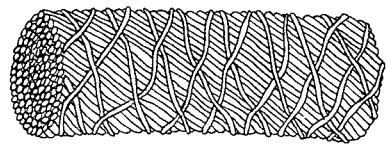
FIG. 24 is an enlarged perspective view of the jet bundled yarn in a modified spinning condition.
Figure 25:
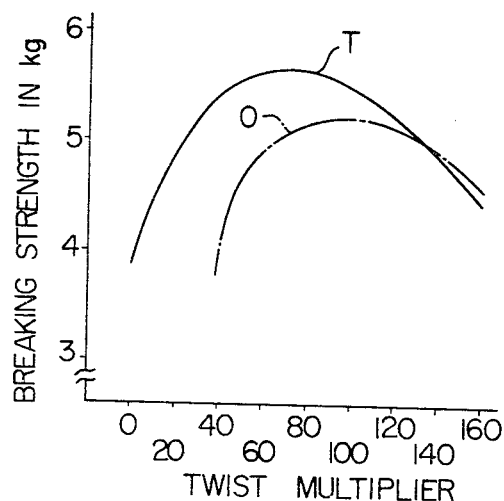
FIGS. 25 and 26 are explanatory diagrams showing the relationship between the breaking strength of a single yarn of jet bundled yarn of the invention and the twist multiplier of additional twist, respectively.
Figure 26:
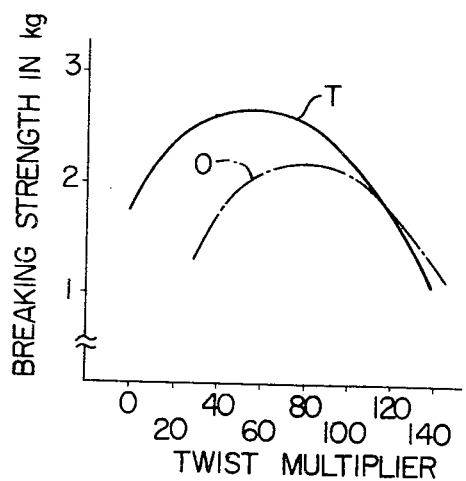

When the net-like configuration is coarse, the jet bundled yarn is preferably provided with a low twist by the conventional twister after take-up. The twisted yarn so formed is stronger than the conventional spun yarn and in FIG. 24, an enlarged perspective view of a low twist yarn formed in accordance with the invention is shown. The preferable twist multiplier of the post-twist of this yarn is less than 70 in the metric system. In FIGS. 25 and 26, comparative diagrams showing the relationship between the breaking strength of yarn and the twist multiplier of the yarn are shown. In the diagrams, O designates the conventional yarn and T designates the post-twisted yarn according to the present invention. The first case, shown in FIG. 25, is an example of 1/10s (metric count system) of polypropylene yarn composed of 2 denier fibers and the second case, shown in FIG. 26, is an example of 1/20s (metric count system) of acrylic fiber yarn composed of 3 denier fibers. It is clear that the strength of the single yarn according to the present invention is stronger in both examples. In FIG. 21, an embodiment of the apparatus of the invention is shown in conjunction with a conventional pot spinning means 44. By using this modified apparatus, the above-mentioned post-twisted yarn of the invention can be produced in one step.

EXAMPLE 1

A polypropylene tow (2 den./filament, total denier 360,000 d.) is used as the material, and sliver produced from tow of these by a Perlock machine is fed to the jet jet bundling apparatus shown in FIG. 1, and several jet bundled yarns are produced according to the following conditions:

Yarn count _____ 1/10s metric count system.
Draft device _____ Ambler system.
Draft ratio between the back roller and the front roller 50.
Jet bundling member (shown in FIG. 9):
   Feed passageway 12 __ Single.
   Inside diameter of the conduit _____ 10 mm.
   Lengths of the conduit 400 mm.

The following table shows a comparison of conditions of the jet bundling process:

| No. | Surface speed, m./min. | | Working tension | | Fluid stream | | Yarn | |
|---|---|---|---|---|---|---|---|---|
| | Front roller | Take-up roller | In g. | Medium | Temp., °C. | Pressure in kg./cm.² | Configuration | Breaking strength in g. |
| 1 | 2,000 | 2,100 | 10 | Steam | 130 | 4.0 | C | 50 |
| 2 | 2,000 | 2,100 | 15 | Superheated steam | 160 | 2.0 | C | 100 |
| 3 | 2,000 | 2,100 | 25 | do | 230 | 1.5 | B | 2,200 |
| 4 | 2,000 | 2,100 | 25 | do | 230 | 2.0 | B | 2,600 |
| 5 | 2,000 | 2,100 | 30 | do | 230 | 3.0 | A | 4,800 |
| 6 | 2,000 | 2,100 | 30 | do | 280 | 2.0 | A | 4,900 |
| 7 | 3,500 | 3,675 | 15 | do | 180 | 2.0 | C | 100 |
| 8 | 3,500 | 3,675 | 25 | do | 230 | 2.6 | B | 1,800 |
| 9 | 3,500 | 3,675 | 25 | do | 230 | 3.0 | B | 1,900 |
| 10 | 3,500 | 3,675 | 30 | do | 280 | 2.0 | A | 3,800 |
| 11 | 3,500 | 3,675 | 30 | do | 330 | 2.0 | A | 4,000 |

In the mentioned table and the tables hereinafter shown, A indicates a very stable configuration of yarn, B indicates a stable configuration of yarn and C indicates a yarn configuration having an insufficient net-like configuration and low yarn strength. It can therefore be seen that the temperature and pressure of the vortical fluid stream are important factors for producing acceptable yarn.

EXAMPLE 2

A polypropylene tow (2 den./filament total denier 360,000 d.) is draft cut by a Perlock machine as to produce a sliver and the sliver of 5.0 g./m. weight is supplied to the apparatus shown in FIG. 1, under the following conditions:

Yarn count _____ 1/10s metric count system.
Draft device _____ Ambler system.
Draft ratio between the back roller and the front roller __ 50.
Jet bundling member (shown in FIG. 5):
   Fluid passageway 12 ____ Double.
   Inside diameter of the conduit _____ 10 mm.
                           200 mm.

The following table shows a comparison of conditions of the jet bundling process:

cut sliver having shrinking property is produced. Then relaxation treatment is applied to the draft cut clivers under the following conditions:

| No. | Relaxation treatment | | Shrinkage by steam of 130° C. in percent |
|---|---|---|---|
| | Medium | Treating period, min. | |
| 24 | 130° C. steam | 20 | 0 |
| 25 | 100° C. steam | 20 | 2 |
| 26 | 70° C. steam | 20 | 5 |
| 27 | 65° C. steam | 20 | 10 |
| 28 | 60° C. steam | 20 | 15 |
| 29 | | | 24 |

A spinning material of 2.0 g./meter is produced by a gill-box from the above-mentioned relaxed sliver and several jet bundled yarns are produced under the following conditions:

Yarn count _____ 1/20 metric count system.
Draft device _____ Double apron system.
Draft ratio between the back roller and the front roller __ 50.
Fluid stream used _____ Temp. of super-heated steam 450° C.
                         Gauge pressure 2 kg./cm.².
Jet bundling member (shown in FIG. 5):
   Fluid passageway 12 ____ Single.
   Inside diameter of the conduit _____ 8 mm.
   Length of the conduit ___ 300 mm.
Effective temp. of the vortical fluid _____ 320° C.
Stretch ratio between the front roller and the take-up roller_ 0.95–1.05.

Note: When using normal fiber without shrinking property, the stretch ratio is preferably above 1%.

The following table shows the quality of the yarn produced in the foregoing example.

| No. | Surface speed, m./min. | | Working tension | | Fluid stream | | Yarn | |
|---|---|---|---|---|---|---|---|---|
| | Front roller | Take-up roller | In g. | Medium | Temp., °C. | Pressure in kg./cm.² | Configuration | Breaking strength in g. |
| 12 | 2,000 | 2,100 | | Air | 20 | 4.0 | D | |
| 13 | 2,000 | 2,100 | | Steam | 130 | 3.0 | D | |
| 14 | 2,000 | 2,100 | 15 | Superheated | 180 | 3.0 | C | 100 |
| 15 | 2,000 | 2,100 | 25 | do | 230 | 1.5 | B | 2,200 |
| 16 | 2,000 | 2,100 | 25 | do | 230 | 2.0 | B | 2,600 |
| 17 | 2,000 | 2,100 | 35 | do | 230 | 3.0 | A | 4,800 |
| 18 | 2,000 | 2,100 | 35 | do | 280 | 2.0 | A | 4,900 |
| 19 | 3,500 | 3,675 | 15 | do | 230 | 1.5 | C | 100 |
| 20 | 3,500 | 3,675 | 25 | do | 230 | 2.0 | B | 1,800 |
| 21 | 3,500 | 3,675 | 25 | do | 230 | 3.0 | B | 1,900 |
| 22 | 3,500 | 3,675 | 35 | do | 280 | 2.0 | A | 3,800 |
| 23 | 3,500 | 3,675 | 35 | do | 330 | 2.0 | A | 4,000 |

As shown in the table, almost the same result shown in Example 1 is obtained. In the table, D indicates failure in producing yarn.

EXAMPLE 3

As acrylic fiber tow (3 den./filament, total denier 480,000 d.) is supplied to a Turbo-stapler and a draft

| No. | Spinning condition | Configuration | Working tension in g. | Breaking strength in g. |
|---|---|---|---|---|
| 24 | Very poor | D | | |
| 25 | do | C | 20 | 200 |
| 26 | Better | B | 28 | 546 |
| 27 | Best | A | 30 | 750 |
| 28 | do | A | 30 | 764 |
| 29 | do | A | 30 | 785 |

EXAMPLE 4

The non-shrinkable sliver (designated by No. 24) and the shrinkable sliver (designated by No. 29) of Example 3 are blended by a gill-box in ratios of 80/20, 60/40, 40/60 and three blended slivers of 2.0 gm. weight are prepared. The jet bundling is carried out under the same condition as that of the Example 3 by using the same jet bundling member. The jet bundled yarns are produced from the above-mentioned prepared sliver, as shown in the following table:

| No. | Fibers composing of the prepared sliver, percent | | Spinning condition, working tension, g. | Yarn quality | |
|---|---|---|---|---|---|
| | Non-shrinkable fiber | Shrinkable fiber | | Configuration | Breaking strength, g. |
| 30 | 80 | 20 | 28 | B | 529 |
| 31 | 60 | 40 | 30 | A | 681 |
| 32 | 40 | 60 | 30 | A | 763 |

NOTE.—The spinning operation of No. 30 was carried out without any trouble, but those of the others were carried out in good condition.

As is clearly shown from the above result, it is preferable to blend more than 20% of the shrinkable fiber in order to obtain the better results.

EXAMPLE 5

A polypropylene tow (15-den/filament, tool denier 450,000 d.) is used as the material and sliver is produced from tow of those by a Perlock machine, heat shrinkage of this is 13.6% in steam at 130° C. and this is fed to the fluid twisting apparatus shown in FIG. 1 to produce jet bundled yarns under the following conditions:

Yarn count _____ 1/6s metric count system.
Draft device _____ Conical fluid control systems.
Draft ratio between the back roller and the front roller _____ 30.
Surface speed of front roller _____ 1,500 m./min.
Surface speed of delivery roller _____ 1,515 m./min.
Fluid stream used _____ Temp. of super-heated steam 300° C. gauge pressure, 2.5 kg./cm.$^2$.

Jet bundling member (see FIG. 12):
  Fluid passageways 12a, 12b _____ Quadruplicate.
  Dia. of the jet bundling conduit _____ 7.5 mm.
  Lenth of yarn passage _____ 1,000 mm.
  Heating temperature _____ 300° C.
Effective temperature of vortical fluid stream _____ 230° C.
Processing tension _____ 35 g.

The jet bundled yarn thus produced has a breaking strength of 3,300 g., breaking extension of 7.5% and uniform appearance with little fluffs.

The following cloth is produced by using the jet bundle yarn produced by the above-mentioned method.
  Structure: Plain weave.
  Yarn used: Warp: 1/6s metric count system. Filing; 1/6s metric count system.
  Yarn density: Warp, 15 inch; filing, 13 inch.

The weaving operation was performed without any preparatory treatment of the yarn, such as a sizing treatment. By the above-mentioned mill test, the excellent weaving quality of the jet bundled yarn was noticed despite the absence of a sizing operation. The weight of the cloth produces was 195 g./m.$^2$, and the cloth has sufficient quality for use as a base fabric of carpet.

EXAMPLE 6

A polypropylene tow (2 den./filament, total denier 420,000 d.) is used as the material, and sliver produced from the tow by a Perlock machine with a cutting ratch of 200 mm. is fed to the drawing machine and roving machine is produce roving yarn having weight of 0.5 g. Roving yarn thus produced and having a heat shrinkage of the composent fiber of 1.4.3 is steam at 130° C., is then fed to a jet bundling apparatus as shown in FIG. 1, and several jet bundled yarns are produced under the following condition:

Yarn count _____ 1/80s metric count system.
Draft device _____ Double apron system.
Draft ratio between the back roller and the front roller _____ 40.
Surface speed of the front roller _____ 2,000 m./min.
Surface speed of the delivery roller _____ 2,060 m./min.
Fluid used _____ Temp. of super heated steam 200° C. gauge pressure 1.7 kg./cm.$^2$.

Jet bundling (see FIG. 10):
  Number of fluid passageways 12a, 12b _____ 2.
  Dia. of jet bundling conduit 11 _____ 6 mm.
  Length of jet bundling conduit 11 _____ 200 mm.
  Effective temperature of vortical fluid stream _____ 200° C.
  Processing tension _____ 25 g.

The manufactured jet bundled yarn has a breaking strength of 430 g. and breaking elongation of 7.0%, with uniform appearance having little fluffs.

EXAMPLE 7

A high shrinkage polyester tow (3 den.×152 mm.) is used as the material, and the gill-box for doubling and drafting to produce a sliver having a weight of 2.0 g./m. The sliver thus produces, whose component fiber has a heat shrinkable property of 25% in steam at 130° C. is then fed to the jet bundling apparatus shown in FIG. 1, and several jet bundled yarns are produced under the following conditions:

Yarn count _____ 1/20s metric count system.
Draft ratio between the front roller and the back roller _____ 40.
Surface speed of the front roller _____ 2,000 m./min.
Surface speed of the delivery roller _____ 2,000 m./min.
Fluid used _____ Temp. of super heated steam. 320° C., gauge pressure 2.0 kg./cm.$^2$.

Jet bundling (see FIG. 10):
  Number of fluid passageways _____ 2.
  Dia. of the jet bundling conduit 11 _____ 8 mm.
  Length of the jet bundling conduit 11 _____ 300 mm.
  Effective temperature of vortical fluid stream _____ 240° C.
  Processing tension _____ 27 g.

Jet bundled yarn thus produces has a breaking strength of 1,650 g., excellent durability suitable for weaving and knitting and a uniform appearance having little fluffs. On the other hand, jet bundled yarn produced from non-heat-shrinkage polyester fiber has a breaking strength of 560 g. and a weaker twisting condition.

EXAMPLE 8

A draft cut sliver from a polyvinyl alchol fiber (2 den./filament, total denier 200,000 d.) is produced by a Perlock machine and a sliver of 2.0 g./meter is prepared by a drawing machine from the draft cut sliver. The sliver thus prepared has a shrinkage of 37% in super-heated steam at 130° C. This material is fed to the apparatus shown in FIG. 1 and a jet bundled yarn is produced under the following condition:

| | |
|---|---|
| Yarn count | 1/20 metric count system. |
| Draft device | Pressure draft system. |
| Draft ratio between the back roller and the front roller | 40. |
| Surface speed of the front roller | 2,000 m./min. |
| Surface speed of the take-up roller | 1,970 m./min. |
| Fluid used | Temp. of super-heated steam 400° C. Gauge pressure 2.0 kg./cm.² |

Jet bundling member (shown in FIG. 13):

| | |
|---|---|
| Fluid passageway | Single. |
| Inside diameter of the conduit | 8 mm. |
| Length of the conduit | 300 mm. |
| Effective temp. of the vortical fluid stream | 270° C. |
| Working tension | 30 g. |

The yarn thus produced has a single breaking strength of 2,550 g. good appearance and soft handling quality. Therefore, the yarn produced can be used as a practical yarn for weaving and knitting.

EXAMPLE 9

A draft cut sliver is produced by a Perlock machine from a polypropylene tow (3 den./filament, total denier 480,000 d.) The staple length of fibers was 150 mm. and the staple fiber produced has shrinkage of 13.7% in steam at 130° C. The sliver produced by the above-mentioned process is blended with a sliver of merino wool having 66s spinning quality by the blending ratio of 30% of polypropylene sliver with 70% merino wool sliver, by using the gill-box, and a blended sliver having 2.0 g./m. weight was produced. The above-mentioned blend-sliver is fed to the apparatus shown in FIG. 1 and the blend yarn is produced under the following spinnig conditions:

| | |
|---|---|
| Yarn count | 1/20 metric count system. |
| Draft device | Double apron system. |
| Draft ratio between the back roller and the front roller | 40. |
| Surface speed of front roller | 2,000 m./min. |
| Surface speed of take-up roller | 2,000 m./min. |
| Fluid used | Temp. of super-heated steam 300° C. Gauge pressure 2.0 kg./cm.² |

Jet bundling element (shown in FIG. 13):

| | |
|---|---|
| Number of fluid passageways | 5. |
| Inside diameter of the conduit 11 | 8 mm. |
| Length of the conduit 11 | 300 mm. |
| Effective temperature of vortical fluid stream | 220° C. |
| Processing tension | 20 g. |

The yarn thus produced has a breaking strength of 680 g. and an excellent and practical strength and softness suitable for weaving and knitting operations.

EXAMPLE 10

A sliver composed of staple fibers having a cut length of 150 mm. is produced from a polypropylene tow (3 den./filament total denier 480,000 d. The fiber has a shrinkable property of 13.7% in steam at 130° C. 70% of the above-mentioned polypropylene sliver is blended with 30% of viscous rayon sliver (3 den. x 120 mm.) on a gill-box to produce a blended sliver having a weight of 5 g./m. The sliver produced is fed to the jet bundling apparatus shown in FIG. 1, and several jet bundled yarns are produced under the following conditions:

| | |
|---|---|
| Yarn count | 1/10s metric count systems. |
| Draft device | Ambler system. |
| Draft ratio between front roller and back roller | 50. |
| Superficial speed of front roller | 2,000 m./min. |
| Superficial speed of delivery roller | 2,050 m./min. |
| Fluid used | Super heated steam temperature 300° C. Pressure 2.0 kg./cm.² |

Jet bundling element (shown in FIG. 13):

| | |
|---|---|
| Number of fluid passageways | 4. |
| Dia. of the jet bundling conduit 11 | 8 mm. |
| Length of the conduit 11 | 300 mm. |
| Effective temperature of vortical fluid stream | 220° C. |
| Processing tension | 27 g. |

The yarn thus produced has a breaking strength of 1,580 g. and an excellent durability suitable for weaving and knitting, with uniform appearance having little fluffs.

EXAMPLE 11

A draft cut sliver is produced by a Perlock machine from a polypropylene tow (3 den./filament, total denier 480,000 d.), and spinning material of sliver having 2.0 g./m. weight is prepared by a drawing machine from the draft cut sliver, the sliver is then treated with a fiber setting machine in steam at 220° C. for 20 minutes, and a sliver of 4.5 g./m. weight is prepared by a drawing machine. The sliver produced has a shrinkage of 3.5% in steam at 130° C. The sliver is then fed to the apparatus shown in FIG. 1, and yarns produced under several spinning conditions:

| | |
|---|---|
| Yarn count | 1/9 metric count system. |
| Draft device | Bottom apron system. |
| Draft ratio between the back roller and the front roller | 40.5. |
| Surface speed of front roller | 1,000 m./min. |
| Fluid used | Temp. of super-heated steam 250° C. — gauge pressure 2 kg./cm.² |

Jet bundling element (shown in FIG. 5):

| | |
|---|---|
| Fluid passageway | Double. |
| Inside diameter of the conduit 11 | 10 mm. |
| Length of the conduit 11 | 200 mm. |

The following table shows the other spinning conditions.

| Number | Surface speed of take-up roller, m./min. | Stretch ratio in percent | Working tension in g. | Breaking strength of yarn in kg. | Yarn appearance |
|---|---|---|---|---|---|
| 41 | 1,000 | | 15 | 3.0 | Bulky. |
| 42 | 1,010 | 1.0 | 28 | 4.3 | Do. |
| 43 | 1,050 | 5.0 | 37 | 5.5 | Tight but soft handling. |
| 44 | 1,075 | 7.5 | 40 | 6.3 | Do. |
| 45 | 1,100 | 10.0 | 50 | 7.2 | Yarn breaks easily. |

NOTE.—The breaking strength of the conventional yarn is about 6–8 kg.

As is clear from the table, the breaking strength of the yarn produced increases with an increase in the stretch ratio, but yarn forming becomes difficult in the over stretch ratio.

EXAMPLE 12

A polypropylene tow (2 den./filament, total denier 360,000 d.) is used as the material, and the sliver produced having a weight of 5.0 g./m. from the tow by a Perlock machine is fed to the jet bundling apparatus shown in FIG. 1 under the following conditions and then twisted further under the condition shown in the following table:

Yarn count _____ 1/10s metric count system.
Draft device _____ Conical tube system.
Draft ratio between the front
 roller and the back roller __ 50.
Surface speed of the front
 roller _____ 2,500 m./min.
Surface speed of delivery
 roller _____ 2,550 m./min.
Fluid used _____ Temp. of super-heated steam 250° C. — gauge pressure 2 kg./cm.²

Jet bundling (shown in FIG. 9):
 Number of fluid passageways _____ 2.
 Dia. of the conduit 11 ___ 7 mm.
 Length of the conduit 11 _ 200 mm.
Processing tension _____ 30 g.

The following table shows the twisting condition.

| No. | Twist/meter | Twist constant | Breaking strength in g. | Breaking elongation in percent |
|---|---|---|---|---|
| 46 | 0 | 5 | 3,846 | 13.6 |
| 47 | 16 | 5 | 4,144 | 13.9 |
| 48 | 31 | 19 | 4,417 | 14.5 |
| 49 | 63 | 20 | 4,903 | 14.4 |
| 50 | 95 | 30 | 5,209 | 15.1 |
| 51 | 158 | 50 | 5,598 | 15.3 |
| 52 | 220 | 70 | 5,707 | 15.0 |
| 53 | 315 | 100 | 5,398 | 14.3 |
| 54 | 410 | 130 | 5,031 | 13.2 |
| 55 | 504 | 160 | 4,455 | 13.4 |

It is evident from the results shown in the above table, that the stress-strain property of jet bundled yarn can be improved remarkably by twisting the yarn slightly. The maximum strength obtained by making the twist multiplier about 70.

It is possible to obtain a jet bundled yarn having the same touch and appearance as those of conventional spun yarns by making the twist multiplier lower than 71.

EXAMPLE 13

A sliver having high shrinking property is produced by a Turbe-stapler from an acrylic fiber tow (3 den./filament, total denier 480,000 d.) and a spinning material in sliver form having a weight of 5 g./m. is prepared by a gill-box. The spinning material is fed to the apparatus shown in FIG. 21 and yarn formed under the following conditions:

Yarn count _____ 1/10s metric count system.
Draft device _____ Double apron system.
Draft ratio between the back
 roller and the front roller __ 50.
Surface speed of the front
 roller _____ 1,000 m./min.
Surface speed of the take-up
 roller _____ 1,050 m./min.
Fluid used _____ Temp. of super-heated steam 400° C. — gauge pressure 2 kg./cm.²

Jet bundling member (shown in FIG. 5):
 Fluid passageway _____ Single.
 Inside diameter of conduit
  11 _____ 10 mm.
 Length of the conduit 11 _ 400 mm.
Working tension _____ 30 g.
Rotation speed of the pot ____ 50,000 r./min.
Theoretical number of twist __ 47.6 T./M.—twist multiplier 15.1.

The yarn produced is rewound to cheese form and treated with steam at a temperature of 130° for 15 minutes. The finished yarn has a breaking strength of 2,230 g. and a breaking elongation of 13.0%, which are qualities suitable for practical use.

EXAMPLE 14

A draft cut sliver is produced by a Perlock machine from a polypropylene tow (3 den./filament, total denier 480,000 d.). The staple length of fibers was 150 mm. and the staple fiber produced has shrinkage of 13.7% in steam at 130° C. The sliver produced by the above-mentioned process is blended with a sliver of merino wool having 66s spinning quality by the blending ratio of 30% polypropylene sliver with 70% merino wool sliver by using the gill-box, and a blended sliver having 2.0 g./m. weight was produced. The blend ratio of the polypropylene fiber is 30%. The above-mentioned blend-sliver is fed to the apparatus shown in FIG. 1 and the blend yarn is produced under the following spinning conditions:

| | |
|---|---|
| Yarn count | 1/20 metric count system. |
| Draft device | Double apron system. |
| Draft ratio between the back roller and the front roller | 40. |
| Surface speed of the front roller | 2,000 m./min. |
| Surface speed of the take-up roller | 2,000 m./min. |
| Fluid used | Temp. of super-heated steam 300° C.—Gauge pressure 2.0 kg./cm.² |

Jet bundling element (shown in FIG. 10):

| | |
|---|---|
| Number of fluid passageways | 2. |
| Inside diameter of the jet bundling conduit 11 | 8 mm. |
| Length of the conduit 11 | 300 mm. |
| Effective temperature of vortical fluid stream | 200° C. |
| Bonding agent contained in the vortical fluid stream | Acrylic resin emulsion. |
| Processing tension | 30 g. |

Fibers contained in the net-like configuration of the above-mentioned yarn are bonded firmly by the bonding agent contained in the fluid stream. The yarn thus produced has a breaking strength of 690 g. and excellent practical properties for weaving and knitting.

What is claimed and desired to be secured by Letters Patent is:

1. A method for producing jet bundled yarn from a strand of fibers comprising; conveying a strand of fibers to a treating zone, and subjecting said strand of fibers in the treating zone to a controlled vortical fluid jet to cause the surface fibers of said strand to form a continuous net-like wrapping around the remaining core fibers of said strand.

2. A method according to claim 1, wherein the strand of fibers is conveyed to the treating zone in a substantially zero twist condition and wherein the core fibers are maintained substantially free from true twist during the forming of said continuous net-like wrapping.

3. A method according to claim 1, wherein the surface fibers are bonded together at their contact points to tightly bind the continuous net-like wrapping around the remaining core fibers.

4. A method for producing jet bundled yarn comprising; continuously feeding a strand of organic fibers to a drafting device, drafting said strand at a predetermined draft ratio, subjecting said drafted strand of fibers to a controlled vortical fluid jet to cause the surface fibers of said drafted strand to form a continuous net-like wrapping around the remaining core fibers of said drafted strand and collecting the thusly formed yarn.

5. A method according to claim 4, wherein the strand of organic fibers is fed to the drafting device in a substantially zero twist condition and wherein the core fibers are maintained substantially free from true twist during the forming of said continuous net-like wrapping.

6. A method according to claim 4, wherein the surface fibers are bonded together at their contact points to tightly bind said continuous net-like wrapping around the remaining core fibers.

7. A method according to claim 4, wherein said strand of organic fibers contains thermo-shrinkable synthetic fibers having a property of 5% shrinkage at a temperature of 130° C.

8. A method according to claim 4, wherein the controlled vortical fluid jet is maintained at a temperature above 130° C.

9. A method according to claim 4, wherein the fluid is super-heated steam.

10. A method according to claim 4, including the step of providing said strand of organic fibers with a bonding agent before forming said continuous net-like wrapping of surface fibers.

11. A method according to claim 4 including the step of providing said strand of organic fibers with a plasticizer before forming said continuous net-like wrapping of surface fibers.

12. A method according to claim 4 wherein said draft operation is carried out at a speed of over 300 m./min.

13. A method according to claim 4, wherein the drafting device has at least a pair of back rollers and a pair of front rollers and the following parameters are used:

$$V < 10T\sqrt{P}$$

$$T > 230$$

where, V is the delivery speed of the front draft rollers in meter/min.

T is the temperature of the vortical fluid jet in ° C., and

P is the gauge pressure of said vortical fluid jet in kg./cm.²

14. A method according to claim 4, further comprising the step of twisting the yarn during the collecting operation and wherein the twist multiplier is below 70 in the metric count system.

15. A method according to claim 4, including the step of twisting the collected yarn and wherein the twist multiplier is below 70 in the metric count system.

16. A method according to claim 4 including the step of stretching the yarn just before collecting said yarn.

17. A method according to claim 4, including the step of heat treating the collected yarn at a temperature above 80° C.

18. An apparatus for producing jet bundled yarn comprising; means for advancing a fiber bundle into a treating zone, and means for directing a controlled vortical fluid jet into said treating zone to swirl the surface fibers of said fiber bundle into a continuous net-like wrapping around the remaining core fibers of said fiber bundle.

19. An apparatus for manufacturing jet bundled yarn comprising; means for continuously drafting a strand of fibers into a bundle of parallel fibers, jet-bundling means positioned downstream from said drafting means, said jet-bundling means including an inlet housing for receiving the drafted fiber bundle, a jet-bundling conduit connected to the said inlet housing for receiving said drafted fiber bundle therefrom, and means including said jet-bundling conduit and said inlet housing for directing a controlled vortical fluid jet into said jet-bundling conduit to swirl the surface fibers of said drafted strand into a continuous net-like wrapping around the remaining core fibers of said drafted strand to form a jet bundled strand and means for collecting the jet bundled strand in the form of yarn as it exits from said pet-bundling means.

20. An apparatus according to claim 19, wherein the means for directing a controlled vortical fluid jet further includes means defining an annular space between the mating portions of said inlet housing and said pet-bundling conduit, said annular means being in fluid communication with said jet-bundling conduit, and fluid supply passage means in fluid communication with said annular passage means to supply heated and pressurized fluid thereto.

21. An apparatus according to claim 20, wherein the supply passage means includes a plurality of bores formed in one end portion of said jet-bundling conduit, said bores being tangentially positioned with respect to said annular space.

22. An apparatus according to claim 20, wherein said jet-bundling conduit has a supplementary fluid supply passage means in fluid communication therewith.

23. An apparatus for manufacturing jet bundled yarn comprising; drafting means including at least a pair of back rollers and a pair of front rollers for continuously drafting a strand of fibers into a bundle of parallel fibers having substantially zero twist, jet-bundling means positioned downstream from said pair of front rollers, said jet-bundling means including an inlet housing positioned adjacent said front rollers for receiving the drafted fiber bundle, a jet-bundling conduit connected to said inlet housing, means defining an annular space surrounding the downstream portion of said inlet housing and in fluid communication with said jet-bundling conduit, means including said inlet housing and said jet-bundling conduit for directing controlled fluid tangentially into said annular means to generate a vortical fluid jet of sufficient magnitude to swirl the surface fibers of said drafted strand into a continuous net-like wrapping around the core fibers of said drafted strand but of insufficient magnitude to substantially twist the core fibers, and means for collecting the fiber bundle in the form of yarn as it exits from said jet-bundling means.

24. An apparatus according to claim 23, wherein said pair of front rollers are driven at a surface speed of over 300 m./min.

25. An apparatus according to claim 23, wherein said inlet housing has a trumpet-like shape spreading outwardly towards said front rollers.

26. An apparatus according to claim 23, wherein said annular means comprises a spiral passageway.

27. An apparatus according to claim 23, including muffler means connected to the downstream end of said jet-bundling conduit, said muffler means comprising inside and outside shells forming a cylindrical space therebetween, baffle means for dividing, said cylindrical space into a plurality of separate compartments, and a plurality of separate passage means for communicating each of said compartments with the interior of said jet-bundling conduit.

28. An apparatus according to claim 23, wherein said drafting means includes draft control means for minimizing the formation of fluffy fibers when the drafting operation is carried out at a speed of over 300 m./min.

29. An apparatus according to claim 28, wherein said draft control means comprises a stationary, tube-like guide member through which said bundle of fibers are conveyed.

30. An apparatus according to claim 28, wherein said draft control means comprises an aspirator-type device having means defining a fiber inlet, a conical tube-like guide member having its larger diametral end connected to said inlet means, and means defining a fluid inlet opening into said conical tube-like guide member to supply fluid thereto.

31. A wrapped yarn comprising; a bundle of fibers having a core portion of fibers having substantially zero twist, and a continuous net-like wrapping of surface fibers surrounding said core portion of fibers, said surface fibers constituting a portion of the original bundle of fibers.

32. A wrapped yarn according to claim 31, wherein the surface fibers are bonded together at their contact points to tightly bind the continuous net-like wrapping around the remaining core portion of fibers.

References Cited

UNITED STATES PATENTS

| | | | |
|---|---|---|---|
| 2,217,826 | 10/1940 | Van Laer | 152—357 |
| 2,302,790 | 11/1942 | Modigliani. | |
| 2,852,906 | 9/1958 | Breen | 28—1 XR |
| 3,000,168 | 9/1961 | Penland | 57—157 XR |
| 3,007,298 | 11/1961 | Williams et al. | 57—36 XR |
| 3,079,746 | 3/1963 | Field | 57—36 XR |
| 3,093,879 | 6/1963 | Yamamoto | 57—157 XR |
| 3,186,155 | 6/1965 | Breen et al. | 57—157 XR |
| 3,255,579 | 6/1966 | Price | 57—36 XR |
| 3,365,872 | 1/1968 | Field | 57—34 XR |

FOREIGN PATENTS 612,002  1/1961  Canada.

DONALD E. WATKINS, Primary Examiner

U.S. Cl. X.R.

57—140, 157